(12) United States Patent
Mc Namee et al.

(10) Patent No.: US 11,624,379 B2
(45) Date of Patent: Apr. 11, 2023

(54) HYDROSTATICALLY DRIVEN VEHICLE WITH A SECONDARY BRAKING OR STEERING SUPPLY

(71) Applicant: Caterpillar SARL, Geneva (CH)

(72) Inventors: Niall Mc Namee, Leicester (GB); William Christopher Swick, Apex, NC (US)

(73) Assignee: Caterpillar SARL, Geneva (CH)

( * ) Notice: Subject to any disclaimer, the term of this patent is extended or adjusted under 35 U.S.C. 154(b) by 283 days.

(21) Appl. No.: 16/891,507

(22) Filed: Jun. 3, 2020

(65) Prior Publication Data

US 2020/0386248 A1 Dec. 10, 2020

(30) Foreign Application Priority Data

Jun. 4, 2019 (GB) ...................................... 1907917

(51) Int. Cl.
| | | |
|---|---|---|
| *F15B 20/00* | (2006.01) | |
| *F15B 11/17* | (2006.01) | |
| *F16H 61/4157* | (2010.01) | |

(52) U.S. Cl.
CPC ....... *F15B 20/004* (2013.01); *F16H 61/4157* (2013.01); *F15B 11/17* (2013.01)

(58) Field of Classification Search
CPC ... F15B 11/17; F16H 61/4078; F16H 61/4157
See application file for complete search history.

(56) References Cited

U.S. PATENT DOCUMENTS

| | | | | |
|---|---|---|---|---|
| 4,369,625 | A * | 1/1983 | Izumi ................... | E02F 9/2242 414/699 |
| 4,505,355 | A * | 3/1985 | Scheurenberg ........ | B60K 17/10 188/170 |
| 4,762,195 | A | 8/1988 | McBurnett | |
| 5,507,360 | A * | 4/1996 | Simmons ................. | B62D 5/07 180/406 |
| 8,403,098 | B2 | 3/2013 | Lunzman et al. | |
| 9,334,939 | B2 | 5/2016 | Krittian et al. | |
| 9,494,222 | B2 | 11/2016 | Versteyhe et al. | |
| 9,533,670 | B2 | 1/2017 | Kohmaescher | |
| 9,938,691 | B2 * | 4/2018 | Hiraku ...................... | F15B 7/06 |
| 2012/0304631 | A1 * | 12/2012 | Nelson .................... | F15B 7/008 60/416 |
| 2015/0059325 | A1 * | 3/2015 | Knussman .............. | F15B 11/17 60/419 |
| 2016/0032945 | A1 * | 2/2016 | Cho ........................ | F15B 1/027 60/413 |
| 2016/0116060 | A1 | 4/2016 | Schumacher | |
| 2017/0113691 | A1 | 4/2017 | Meehan et al. | |
| 2019/0136877 | A1 * | 5/2019 | Babbitt ............... | F16H 61/4157 |

FOREIGN PATENT DOCUMENTS

| | | |
|---|---|---|
| CN | 106494500 A | 3/2017 |
| DE | 102012214831 A1 | 5/2014 |
| GB | 2509186 A | 6/2014 |

* cited by examiner

*Primary Examiner* — Kenneth Bomberg
*Assistant Examiner* — Matthew Wiblin
(74) *Attorney, Agent, or Firm* — von Briesen & Roper, s.c.

(57) ABSTRACT

The hydraulic braking or steering system of a vehicle driven by a hydraulic motor is provided with a secondary supply of hydraulic pressure in the event of failure of the primary supply to the system. The secondary supply is generated by the hydraulic motor when ground-driven by the momentum of the moving vehicle.

16 Claims, 1 Drawing Sheet

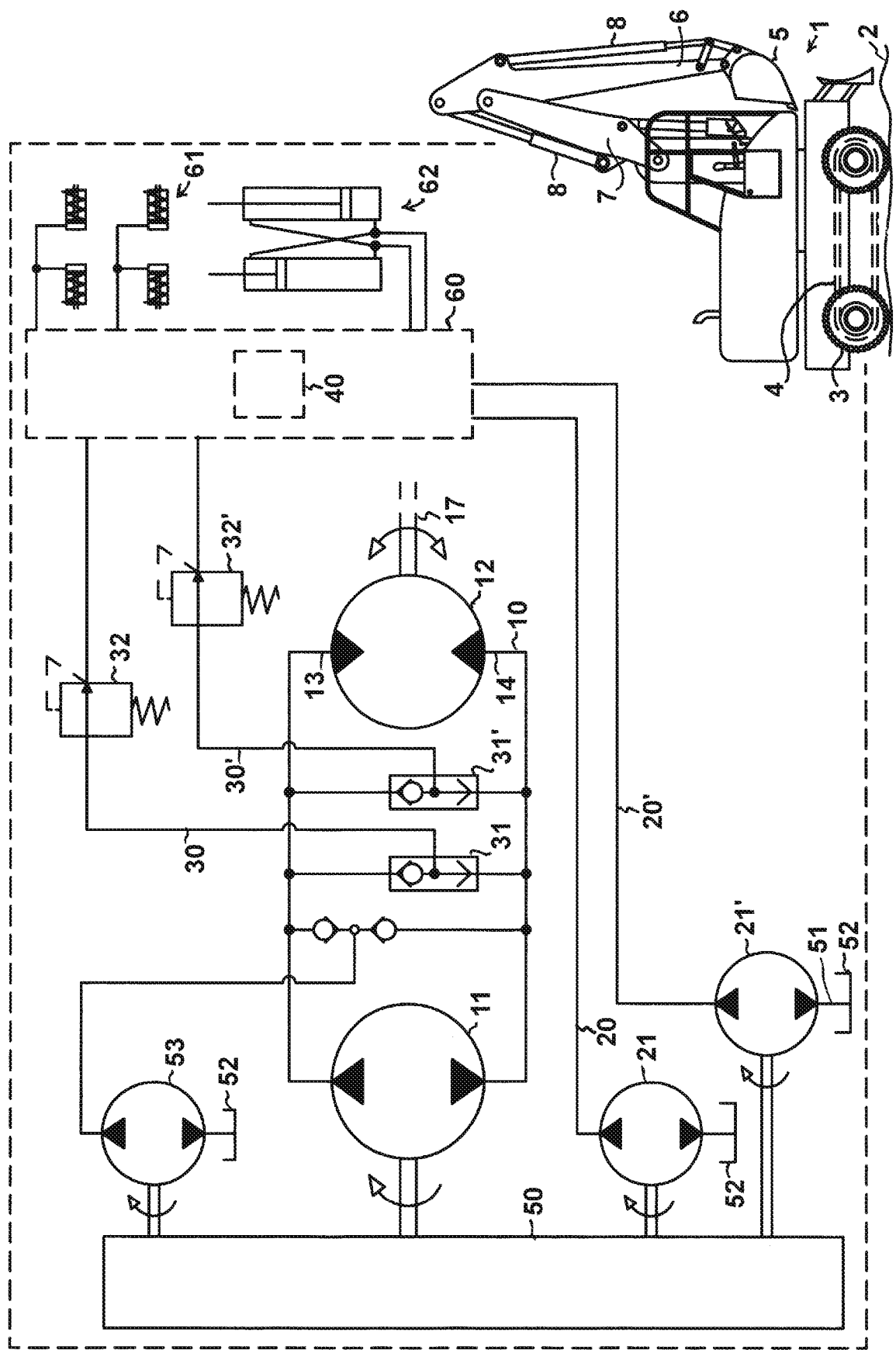

HYDROSTATICALLY DRIVEN VEHICLE WITH A SECONDARY BRAKING OR STEERING SUPPLY

CROSS-REFERENCE TO RELATED APPLICATION

This application claims priority under 35 USC § 119 and the Paris Convention to Great Britain Patent Application No. 1907917.7 filed on Jun. 4, 2019.

TECHNICAL FIELD

This disclosure relates to hydrostatically driven vehicles having a secondary supply of hydraulic pressure for operating a hydraulic braking or steering system in the event of failure of the primary supply.

BACKGROUND

A vehicle with a hydrostatic transmission may drive its hydraulic motor as a pump during deceleration, so that the vehicle may be braked by its prime mover acting through the hydraulic circuit.

By way of example, US20160116060A1 teaches such a system wherein the displacement volume of the hydraulic motor or the hydraulic pump that drives it is actively controlled to brake the vehicle, with a pressure relief valve arranged across the hydraulic motor to convert excess kinetic energy into heat.

Hydrostatically driven machines will typically also include hydraulically powered braking and steering systems which are supplied with pressure by one or more additional hydraulic pumps dedicated to those systems. Each system may be supplied from a separate primary hydraulic pump, or both systems may share the flow from a common primary hydraulic pump.

Although the braking effect of the hydrostatic transmission can assist in decelerating the vehicle in an emergency, it cannot fully compensate for a loss of the primary braking system. Thus, a secondary supply must be provided to maintain hydraulic pressure for braking and steering in the event of failure of the primary pump.

The secondary supply may be provided by an accumulator or by a secondary hydraulic pump. The secondary pump may be electrically driven or may be connected to the mechanical transmission so that it is ground-driven by the momentum of the vehicle. A secondary pump can potentially supply pressure for longer than an accumulator, but adds cost and complexity.

SUMMARY

In a first aspect, the present disclosure provides a vehicle including a set of wheels or tracks and first, second and third hydraulic circuits.

The first hydraulic circuit includes a first hydraulic pump and a hydraulic motor. The first hydraulic pump is arranged to supply hydraulic pressure to drive the hydraulic motor, which is arranged to drive the wheels or tracks to drive the vehicle in motion over a ground surface.

The second hydraulic circuit includes a second hydraulic pump for supplying hydraulic pressure for braking or steering the vehicle.

The third hydraulic circuit is arranged to supply hydraulic pressure, generated by the hydraulic motor driven by momentum of the vehicle in motion over the ground surface, for braking or steering the vehicle in the event of failure of the second hydraulic circuit.

In a related aspect, the disclosure provides a method for controlling the vehicle, including arranging the third hydraulic circuit to supply hydraulic pressure generated by the hydraulic motor driven by momentum of the vehicle in motion over the ground surface, and, in the event of failure of the second hydraulic circuit, supplying hydraulic pressure from the third hydraulic circuit for braking or steering the vehicle.

BRIEF DESCRIPTION OF THE DRAWINGS

Further features and advantages will become apparent from the illustrative embodiment which will now be described, purely by way of example and without limitation to the scope of the claims, and with reference to the accompanying drawing, in which:

FIG. 1 shows a hydrostatically driven vehicle equipped with hydraulic circuits in accordance with a first embodiment.

DETAILED DESCRIPTION

In this specification, a hydraulic circuit means at least a hydraulic flowpath for conveying hydraulic pressure, irrespective of whether the flowpath carries a circulatory flow of hydraulic fluid. Of course, a circulatory flow may be present.

Referring to FIG. 1, a vehicle 1 is supported on the ground surface 2 by a set of wheels 3 or tracks 4. The vehicle 1 may be configured for example for carrying a load, optionally in a body that can be raised and lowered by a hydraulic actuator on the vehicle responsive to operator commands. Alternatively as shown the vehicle may be configured as a work machine to operate a tool 5, for example, a bucket or a grab, which is mounted on the vehicle. Typically the tool will be mounted at the distal end of an arm or stick 6 which in turn is mounted at the distal end of another arm or boom 7, with the boom and stick being pivotably connected and movable by hydraulic actuators 8 to manipulate the tool 5 responsive to operator commands.

The vehicle includes a first hydraulic circuit 10, which includes a first hydraulic pump 11 and a hydraulic motor 12. The first hydraulic pump 11 is driven by the internal combustion engine or other prime mover 50 of the vehicle and is arranged to supply hydraulic pressure to drive the hydraulic motor 12, which in turn is connected via its output shaft or other output component 17 to the mechanical transmission components (e.g. axles or driveshafts or wheel or wheel hub assemblies) of the vehicle to drive the wheels 3 or tracks 4 to drive the vehicle 1 in motion over the ground surface 2.

As known in the art, the first hydraulic circuit 10 may be supplied with hydraulic fluid 51 from the tank 52 by a charge pump 53 which maintains a supply of hydraulic fluid at relatively low pressure (e.g. about 30 bar) to whichever side of the circuit 10 is at a lower pressure.

As known in the art, the first hydraulic pump 11 may be configured to act as a motor if back-driven by the flow of hydraulic fluid generated in the first hydraulic circuit 10 by the hydraulic motor 12 when the hydraulic motor 12 is driven by the momentum of the vehicle 1 moving over the ground. As further known in the art, the first hydraulic pump 11 may be configured to rotate in only one direction when so back-driven, irrespective of the direction of flow of the hydraulic fluid in the first hydraulic circuit 10, to conform to the direction of rotation of the prime mover 50.

The first hydraulic circuit 10 and other circuits of the vehicle are illustrated in simplified form, but may include other components and features as well known in the art.

The vehicle 1 further includes a hydraulic system 60 for braking and/or steering the vehicle, which is generally conventional and not shown in detail. The system 60 may be configured to operate brakes 61 to brake the wheels 3 or tracks 4 of the vehicle responsive to operator commands and/or sensor input. Additionally or alternatively, the system 60 may be configured to steer the wheels, for example, by operating a steering actuator assembly 62, responsive to operator commands.

The braking, steering, or braking and steering functions of the hydraulic system 60 are performed by hydraulic pressure supplied to the hydraulic system 60 by a second hydraulic pump 21 forming part of a second hydraulic circuit 20. The second hydraulic pump 21 may be driven directly or indirectly by the prime mover 50 as shown, or by an electric motor or other power source.

A third hydraulic circuit 30 is arranged to supply hydraulic pressure generated by the hydraulic motor 12 in the first circuit 10 when the motor 12 is driven in rotation by the momentum of the vehicle 1 in motion over the ground, acting through the output shaft or other output component 17 of the hydraulic motor 12 which is mechanically connected to the wheels 3 or tracks 4 via the mechanical transmission components (e.g. axles or driveshafts or wheel and wheel hub or drive sprocket assemblies) of the vehicle, in the event of failure of the second hydraulic circuit 20. Thus, the rotor of the hydraulic motor 12 is driven in rotation, via the rotating mechanical assembly that connects it to the wheels or tracks, by the rotation of the wheels 3 or tracks 4 of the vehicle while the vehicle moves over the ground surface 2.

The third hydraulic circuit 30 may supply the hydraulic pressure to the system 60 for braking or steering or both braking and steering the vehicle 1.

Where the vehicle is driven on wheels 3, an additional hydraulic circuit 20' including an additional hydraulic pump 21' may be arranged and driven in a similar way to the second hydraulic circuit 20 and pump 21 for supplying hydraulic pressure for braking the wheels, while the second hydraulic circuit 20 and pump 21 supply pressure for steering the wheels.

For example, both the second hydraulic pump 21 and the additional hydraulic pump 21' may be driven directly or indirectly by the prime mover 50, as shown.

The third hydraulic circuit 30 may be arranged to supply hydraulic pressure for either or both of steering and braking the wheels 3 in the event of failure of either or both of the second hydraulic circuit 20 and the additional hydraulic circuit 20'.

Alternatively, the third hydraulic circuit 30 may be arranged to supply hydraulic pressure only for steering the wheels 3 in the event of failure of the second hydraulic circuit 20, with a fourth hydraulic circuit 30' similar to the third hydraulic circuit 30 being arranged to supply hydraulic pressure, generated by the hydraulic motor 12 driven by the momentum of the vehicle in motion over the ground surface, for braking the wheels 3 in the event of failure of the additional hydraulic circuit 20'.

The third or fourth hydraulic circuit 30, 30' may be arranged (e.g. by connecting it via a suitable valve arrangement) to supply pressure to the steering and/or braking system 60 whenever it has a higher available pressure than the primary supply from the respective, second or additional circuit 20, 20'.

Alternatively, failure of either or each of the second and additional hydraulic circuits 20, 20' may be detected by a failure detection and control arrangement 40, which may further be arranged to supply pressure from either or each of the third and fourth hydraulic circuits 30, 30' responsive to detecting the failure.

The detection and control arrangement 40 could include a hydraulic valve arrangement, for example, a shuttle valve or a non-return valve assembly. The hydraulic valve arrangement may be selectively operable to open to permit a flow of hydraulic fluid from the third or fourth circuit 30, 30' when that circuit is at a higher pressure than the failed circuit, or when the failed circuit drops below a predefined threshold pressure. Alternatively or additionally, the detection and control arrangement 40 may include an electromechanical arrangement, which may further include one or more electrical or electronic pressure sensors and an electronic controller for controlling hydraulic valves in the respective circuit or circuits responsive to changes in the detected pressure or other sensor input.

The hydraulic motor 12 may be operable by a flow of hydraulic fluid 51 between first and second ports 13, 14 of the hydraulic motor, and is arranged as common in the art to generate hydraulic pressure in the first circuit 10 when ground-driven (which is to say, back-driven) by the momentum of the moving vehicle acting through its output shaft 17.

The third or fourth or each of the third and fourth hydraulic circuits 30, 30' may be fluidly connected to both of the first and second ports 13, 14 to supply pressure from either one of the first and second ports 13, 14 which is at a higher pressure than the other. This may be accomplished as shown by arranging a valve assembly, such as a shuttle valve 31, 31' which may be either internal to the motor 12 or external as shown, to select the higher pressure from the two sides of the first hydraulic circuit 10 communicating respectively with the first and second ports 13, 14. In this way, the third and fourth circuits 30, 30' can supply pressure to the braking and/or steering system 60 when the motor 12 is back-driven via its output shaft 17 in either the normal, forward direction or the reverse direction depending on the direction of movement of the vehicle 1 over the ground.

A pressure limiting valve 32, 32' may be arranged in either or both of the third and fourth circuits 30, 30' to limit the supplied pressure as required by the hydraulic system 60.

In accordance with the novel method, the vehicle 1 is controlled by arranging the third 30 (or each of the third and the fourth 30, 30') hydraulic circuit to supply hydraulic pressure generated by the hydraulic motor 12 driven by momentum of the vehicle 1 in motion over the ground surface 2, and, in the event of failure of the second hydraulic circuit 20 (or either or both of the second and additional hydraulic circuits 20, 20'), supplying hydraulic pressure from the respective, third or fourth hydraulic circuit 30, 30', or both the third and fourth hydraulic circuits 30, 30', for braking and/or steering the vehicle 1.

In summary, the hydraulic braking or steering system 60 of a vehicle 1 driven by a hydraulic motor 12 is provided with a secondary supply of hydraulic pressure in the event of failure of the primary supply to the system 60. The secondary supply is generated by the hydraulic motor 12 when ground-driven by the momentum of the moving vehicle 1.

INDUSTRIAL APPLICABILITY

The novel arrangement may be used in place of the conventional, electrically driven or ground-driven secondary pumps to supply pressure to the braking or steering system in the event of failure of the primary supply. The hydraulic motor 12 will supply pressure while the vehicle remains in motion so that braking and/or steering systems remain operational until the vehicle 1 comes to rest.

Where the or each hydraulic pump 21, 21' providing the primary supply is driven by the prime mover 50, the third 30 or third and fourth 30, 30' hydraulic circuits will continue to supply pressure while the vehicle 1 remains in motion in the event that the primary supply from the second hydraulic pump 21 or both second and additional hydraulic pumps 21, 21' fails due to failure of the prime mover 50.

Many adaptations are possible within the scope of the claims.

In the claims, reference numerals in parentheses are provided purely for ease of reference and should not be construed as limiting features.

What is claimed is:

1. A vehicle including:
   a set of wheels or tracks;
   a first hydraulic circuit including a first hydraulic pump and a hydraulic motor, the first hydraulic pump being arranged to supply hydraulic pressure to drive the hydraulic motor, the hydraulic motor being arranged to drive the wheels or tracks to drive the vehicle in motion over a ground surface;
   a second hydraulic circuit including a second hydraulic pump for supplying hydraulic pressure for braking or steering the vehicle;
   a third hydraulic circuit for supplying hydraulic pressure for braking or steering the vehicle in the event of failure of the second hydraulic circuit, wherein the third hydraulic circuit is arranged to supply hydraulic pressure generated by the hydraulic motor driven by momentum of the vehicle in motion over the ground surface; and
   a detection and control arrangement fluidly connected to the second hydraulic circuit and the third hydraulic circuit, wherein the failure detection and control arrangement comprises a hydraulic valve arrangement that is selectively operable to open to permit flow of the hydraulic fluid from the third hydraulic circuit for braking or steering the vehicle when the failure of the second hydraulic circuit is detected, wherein the detection and control arrangement is configured to:
   detect a failure of the second hydraulic circuit to supply hydraulic pressure for braking or steering the vehicle, wherein the hydraulic valve arrangement detects the failure of the second hydraulic circuit when the third hydraulic circuit has a higher pressure than the second hydraulic circuit, and
   supply the hydraulic pressure from the third hydraulic circuit for braking or steering the vehicle in response to detecting the failure of the second hydraulic circuit.

2. A vehicle according to claim 1, wherein the hydraulic motor is operable by a flow of hydraulic fluid between first and second ports of the hydraulic motor, and the third hydraulic circuit is fluidly connected to both of the first and second ports to supply pressure from either one of the first and second ports which is at a higher pressure than the other.

3. A vehicle according to claim 2, wherein the second and third hydraulic circuits are arranged to supply hydraulic pressure for braking the wheels or tracks.

4. A vehicle according to claim 1, wherein the second and third hydraulic circuits are arranged to supply hydraulic pressure for braking the wheels or tracks.

5. A vehicle according to claim 1, wherein the wheels or tracks are wheels, and the second and third hydraulic circuits are arranged to supply hydraulic pressure for steering the wheels.

6. A vehicle according to claim 5, including an additional hydraulic circuit, the additional hydraulic circuit including an additional hydraulic pump for supplying hydraulic pressure for braking the wheels;
   the third hydraulic circuit being further arranged to supply hydraulic pressure for braking the wheels in the event of failure of the additional hydraulic circuit.

7. A vehicle according to claim 6, wherein the hydraulic motor is operable by a flow of hydraulic fluid between first and second ports of the hydraulic motor, and the third hydraulic circuit is fluidly connected to both of the first and second ports to supply pressure from either one of the first and second ports which is at a higher pressure than the other.

8. A vehicle according to claim 1, wherein the wheels or tracks are wheels, and the second and third hydraulic circuits are arranged to supply hydraulic pressure for steering the wheels;
   the vehicle including an additional hydraulic circuit, the additional hydraulic circuit including an additional hydraulic pump for supplying hydraulic pressure for braking the wheels;
   and further including a fourth hydraulic circuit for supplying hydraulic pressure for braking the wheels in the event of failure of the additional hydraulic circuit, wherein the fourth hydraulic circuit is arranged to supply hydraulic pressure generated by the hydraulic motor driven by the momentum of the vehicle in motion over the ground surface.

9. A vehicle according to claim 8, wherein the hydraulic motor is operable by a flow of hydraulic fluid between first and second ports of the hydraulic motor, and each of the third and fourth hydraulic circuits is fluidly connected to both of the first and second ports to supply pressure from either one of the first and second ports which is at a higher pressure than the other.

10. A method for controlling a vehicle, the vehicle including:
    a set of wheels or tracks;
    a first hydraulic circuit including a first hydraulic pump and a hydraulic motor, the first hydraulic pump being arranged to supply hydraulic pressure to drive the hydraulic motor, the hydraulic motor being arranged to drive the wheels or tracks to drive the vehicle in motion over a ground surface;
    a second hydraulic circuit including a second hydraulic pump for supplying hydraulic pressure for braking or steering the vehicle;
    a third hydraulic circuit for supplying hydraulic pressure for braking or steering the vehicle in the event of failure of the second hydraulic circuit; and
    a failure detection and control arrangement fluidly connected to the second hydraulic circuit and the third hydraulic circuit;
    the method including:
    arranging the third hydraulic circuit to supply hydraulic pressure generated by the hydraulic motor driven by momentum of the vehicle in motion over the ground surface;
    detecting failure of the second hydraulic circuit at the failure detection and control arrangement, wherein detecting failure of the second hydraulic circuit comprises determining that the third hydraulic circuit has a higher pressure than the second hydraulic circuit; and in response to the detection of failure of the second hydraulic circuit at the failure detection and control arrangement, supplying hydraulic pressure from the third hydraulic circuit for braking or steering the vehicle, wherein supplying hydraulic pressure from the third hydraulic circuit comprises opening a hydraulic valve arrangement of the failure detection and control arrangement to permit flow of the hydraulic fluid from the third hydraulic circuit for braking or steering the vehicle when the failure of the second hydraulic circuit is detected.

11. The vehicle according to claim 1, wherein the failure detection and control arrangement comprises an electromechanical arrangement that is selectively operable to open to permit flow of the hydraulic fluid from the third hydraulic circuit for braking or steering the vehicle when the failure of the second hydraulic circuit is detected.

12. The vehicle according to claim 11, wherein the electromechanical arrangement comprises:
a hydraulic valve;
an electronic pressure sensor; and
an electronic controller operatively connected to the hydraulic valve and the electronic pressure sensor, the electronic controller being programmed to:
detect pressure changes in the second hydraulic circuit at the electronic pressure sensor, and
control the hydraulic valve to supply hydraulic pressure from the third hydraulic circuit for braking or steering the vehicle in response to the pressure changes.

13. The vehicle according to claim 1, wherein the hydraulic valve arrangement detects the failure of the second hydraulic circuit when a pressure of the second hydraulic circuit falls below a predefined threshold pressure.

14. The vehicle according to claim 10, wherein detecting failure of the second hydraulic circuit comprises determining that a pressure of the second hydraulic circuit falls below a predefined threshold pressure.

15. The vehicle according to claim 10, wherein supplying hydraulic pressure from the third hydraulic circuit comprises opening an electromechanical arrangement of the failure detection and control arrangement to permit flow of the hydraulic fluid from the third hydraulic circuit for braking or steering the vehicle when the failure of the second hydraulic circuit is detected.

16. The vehicle according to claim 15, wherein detecting failure of the second hydraulic circuit comprises detecting pressure changes in the second hydraulic circuit at an electronic pressure sensor of the electromechanical arrangement, and opening the electromechanical arrangement comprises controlling an hydraulic valve of the electromechanical arrangement to supply hydraulic pressure from the third hydraulic circuit for braking or steering the vehicle in response to the pressure changes.

* * * * *